United States Patent Office 2,767,318
Patented Oct. 16, 1956

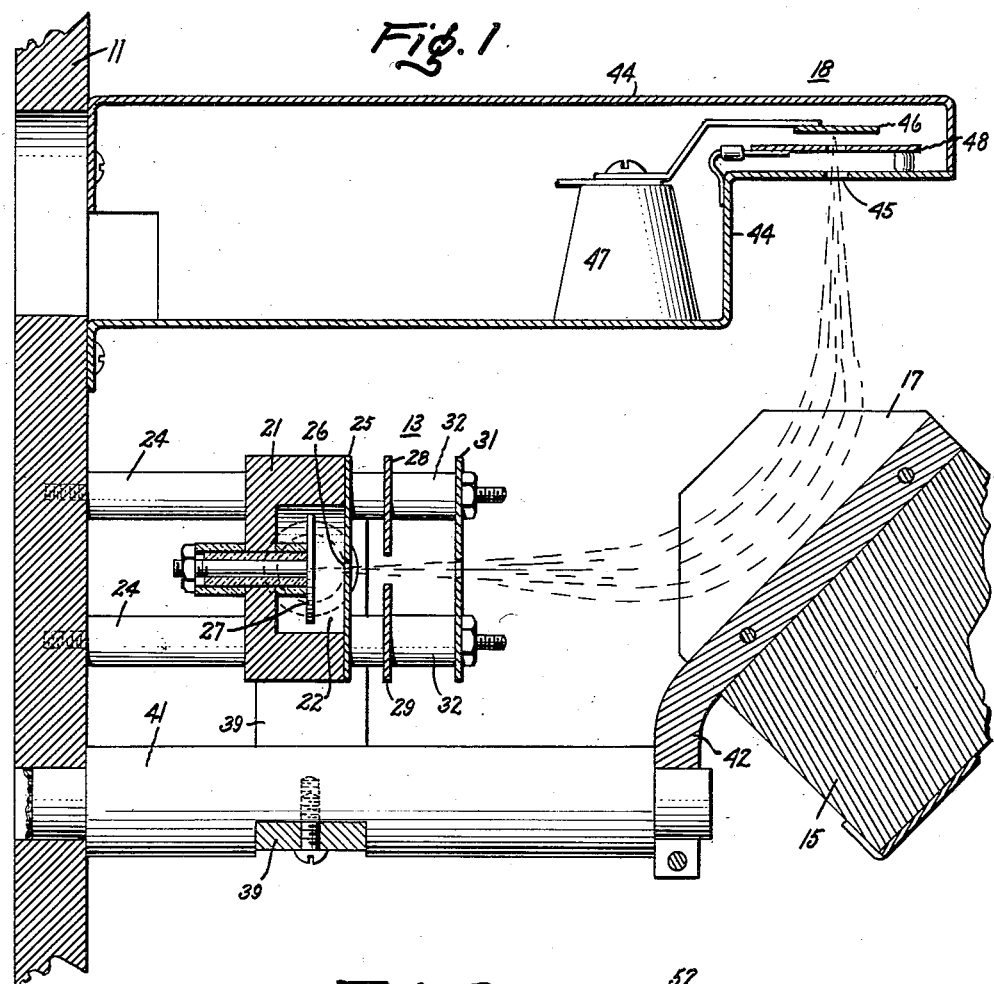
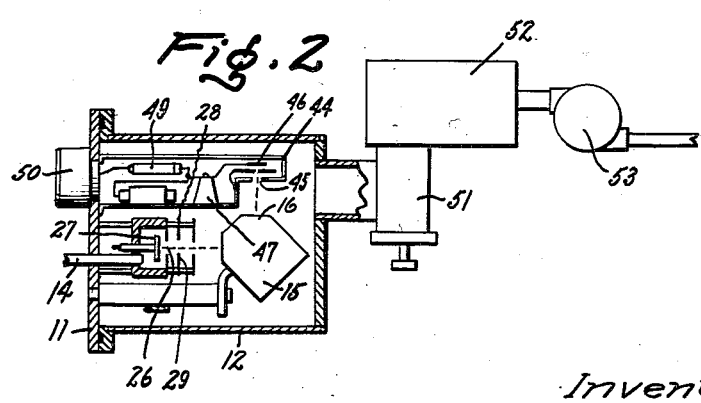

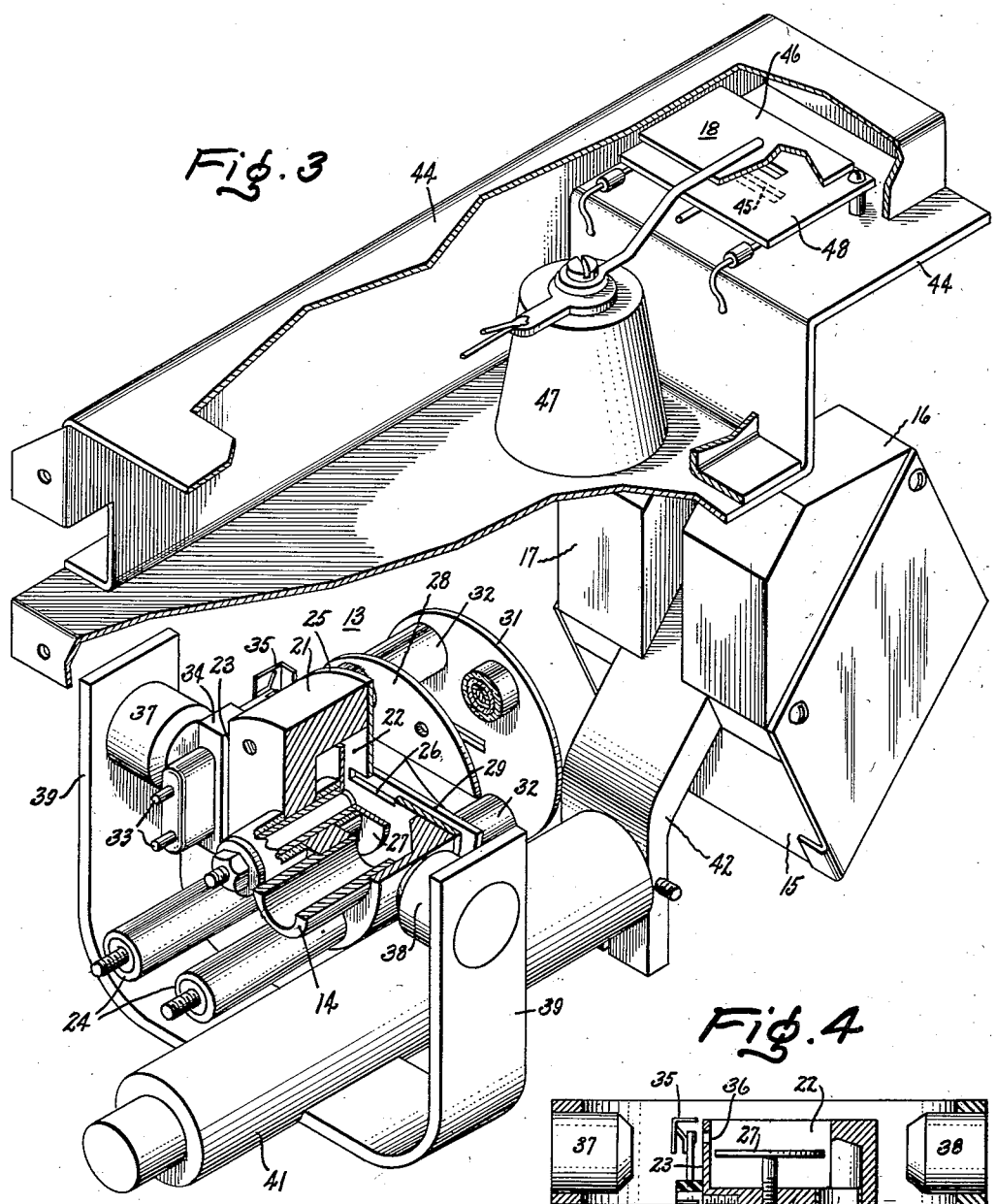

2,767,318

GAS ANALYZING INSTRUMENT

Leonard A. Dietz, Pattersonville, N. Y., assignor to General Electric Company, a corporation of New York Application October 29, 1954, Serial No. 465,531

4 Claims. (Cl. 250—41.9)

The present invention relates to gas analyzing instruments.

More particularly, the invention relates to mass spectrometer type gas analyzing instruments used primarily for detecting tracer gases introduced into pressure or vacuum systems for leak detection purposes.

Gas analyzing instruments of the above-identified type have been available to industry for a number of years, and for a description of a particular construction of one of these instruments, reference is made to U. S. Patent No. 2,504,530—R. B. Jacobs, issued April 18, 1950, Vacuum Leak Detector Method. While the presently known gas analyzing instrument constructions have been suitable in many respects, they are not entirely satisfactory for a number of reasons. The most important failure of existing constructions is their relatively high cost and complexity of design. A second undesirable characteristic of known instrument constructions is the difficulty experienced in initially aligning the various component parts of the instrument, and in maintaining such alignment under operating conditions.

It is, therefore, one object of the present invention to provide a mass spectrometer gas analyzing instrument which is simple in design and relatively inexpensive to manufacture.

Another object of the invention is to provide an instrument of the above type wherein the component parts can readily be aligned at the time the instrument is initially placed in operation, and wherein such alignment can be maintained with a minimum of effort.

A further object of the invention is to provide a mass spectrometer type gas analyzing instrument which incorporates the above features but which has comparable or better operating characteristics than existing instruments of the same type.

In practicing the invention, a mass spectrometer gas analyzing instrument is provided wherein a separate analyzer tube is not required, and all essential components of the instrument are mounted on a single supporting member that can readily be assembled in vacuum tight relationship within a housing capable of being evacuated to a high degree. In a preferred embodiment of the invention a housing is provided which is designed to be maintained under a high vacuum. An ion source is supported within a housing and a means is made available for introducing a gas sample to be analyzed into the ion source. A pair of magnets are secured within the housing and are positioned on opposite sides of the ion beam path produced by the ion source and cause the ions in the ion beam to be separated out into different characteristic ion beams having distinct mass-to-charge ratios. A collector assembly is also secured within the housing and is disposed in the ion beam path for deriving an output electric signal representative of the number of ions having a desired mass-to-charge ratio.

Other objects, features, and attendant advantages of this invention will be appreciated more readily as the same becomes better understood by reference to the following detailed description, when considered in connection with the accompanying drawings, wherein like parts are identified by the same reference characteristic and wherein:

Fig. 1 is a sectional view of a mass spectrometer type gas analyzing instrument constructed in accordance with the present invention;

Fig. 2 is a partial cross-sectional view of the instrument shown in Fig. 1, and illustrates the same in assembled relation with a suitable vacuum system therefor;

Fig. 3 is a broken-away perspective view of the instrument shown in Fig. 1, and illustrates the details of construction thereof; and Fig. 4 is a cross-sectional view of the ion source portion of the instrument shown in Fig. 1.

The gas analyzing instrument shown in Fig. 1 of the drawings comprises a base member 11 which may be constructed of stainless steel or some other conductive material, and, as is best seen in Fig. 2 of the drawings, is adapted to form one wall of a housing 12 that is designed to be evacuated by a suitable vacuum system. Mounted on the base member 11 is an ion source 13 having an inlet tube 14, best seen in Figs. 3 and 4 of the drawings, for introducing a gaseous sample to be analyzed into the ion source. Also mounted on base member 11 is a magnet 15 having a pair of spaced apart pole pieces 16 and 17 which are positioned on opposite sides of the ion beam path produced by the ion source 13. Also disposed in the ion beam path at a point farther away from the ion source 13 than the permanent magnets is a collector assembly 18.

The ion source 13 comprises a generally cylindrical block 21 having an open sided hollow chamber 22 formed therein and having one exterior surface 23 thereof machined to present a flat rectilinear mounting, as is best shown in Fig. 3 of the drawings. The block 21 is supported on the base member 11 by a plurality of insulating supports 24, and has the inlet tube 14 connected thereto for providing access into the hollow chamber 22 for the gases to be analyzed. An apertured plate 25 is secured to the open face of the block 21 that has a small slit aperture 26 therein which defines an exit slit for the ions produced within the chamber 22. Directly opposite the exit slit 26, a pusher electrode 27 is secured within the hollow chamber 22 by means of an insulating support that has a central mounting post extending through the insulating support to a point exterior of the chamber for providing electrical contact thereto. Also secured to the block 21 are a plurality of accelerating electrodes formed by a pair of opposed semi-circular shaped plates 28 and 29 spaced apart a sufficient distance to accommodate the ion beam, and a second plate 31 having a slit aperture centrally disposed therein to provide a passageway for the ion beam. Each of the plates 28, 29 and 31 are supported on the block 21 by means of a plurality of insulating posts 32 threadably secured to the block 21 by studs attached thereto.

Detachably secured to the flat side 23 of block 21 is an electron filament assembly that comprises an electron emissive ribbon of tungsten, or other similar material supported between a pair of terminal posts 33. The posts 33 are mounted in a suitable insulating support 34, and have a reflector 35 attached to the end thereof in back of the electron emissive ribbon. Electron emissive filament is aligned with an aperture 36 formed in the side of block 21, best seen in Fig. 4 of the drawings, which allows passage of electrons emitted from the filament, and serves to shape the electrons into a thin pencil-like beam. The electron filament assembly is supported between, and aligned with, a pair of permanent magnets 37 and 38 which are secured in opposite ends of a mounting post 41 secured in the base member 11.

In operation a gaseous sample to be analyzed is introduced into the hollow chamber 22 through gas inlet tube 14 where it is bombarded by the electron beam produced by the electron filament in cooperation with the aperture 36 in the side of block 21. Bombardment of the molecules of gas by the electrons results in the production of a number of positive ions in accordance with the well-known electron bombardment phenomenon, and the ions thus produced are subjected to the combined influence of the pusher-electrode 27 with the accelerating electrodes 25, 28, 29, and 31. The combined action of all of these electrodes causes the ions formed in the chamber 22 to be shaped into an ion beam that passes out through the exit slits in the accelerating electrodes and on into the influence of the permanent magnet 17. The electrons which are not utilized in forming ions by direct impact with the molecules of gas, continue on across the chamber and discharge upon the walls of the block 21 which is in effect at ground potential. To ensure proper sensitivity of the instrument and a speedy response to the changes in the composition of the gaseous sample introduced through the inlet tube 14, the ratio of the slit diameters of the exit slit in accelerating electrode 25 is adjusted so that a differential pressure exists between the chamber and the accelerating electrode region having a ratio of about 10 to 1. By properly proportioning these values and the size of the aperture 36 in block 21 for accommodating the electron beam, high sensitivity of the ion source can be maintained. Also by positioning the electron emitter outside of the high pressure region of the ion source in the manner illustrated, the region in the neighborhood of the filament is evacuated to the same degree as the remainder of the housing and results in prolonging the life of the filament. In addition, by positioning the electron filament assembly in this manner, it can be more readily removed thus simplifying maintenance of the instrument.

The first set of magnets formed by the pole pieces 16 and 17 in conjunction with the permanent magnet 15, are supported on an angle plate 42 secured to the end of the mounting post 41. While the construction discloses a single magnet having two separate pole pieces to form the two sets of magnets, it is believed obvious that two separate and distinct permanent magnets, such as Alnico magnets, could be substituted in place of the arrangement shown. The spaced apart pole pieces 16 and 17 serve to develop an analyzing magnetic field therebetween which acts upon the ion beam produced by the ion source 13 to separate the ions therein into distinct ion beams having characteristic mass-to-charge ratios. The action of the magnetic field is to cause the ions to make circular paths with radii having values given by the equation $$\frac{m}{e} = 4.82 \times 10^{-5} \frac{R^2 B^2}{V}$$

where

R is the radius of the path in centimeters,
B is the magnetic field strength in Gauss,
m is the mass of the ions expressed in atomic mass units on the physical scale,
V is the energy of the ions in volts electrostatic units, and
e is the charge of the ions in the electrostatic units.

This equation shows that for a given accelerating voltage and magnetic field strength, the radius of the path taken by an ion as proportional to the square root of its mass. The action of the magnetic field therefor is to segregate the heterogeneous ion beam formed by the ion source 13 into a fan of separate ion beams each of which contains ions having a specific mass only.

In order to select or measure the magnitude of a particular ion beam that might be made up of ions formed from a tracer gas used to detect leaks in the vacuum or pressure system introduced into the chamber 22 of source 14, a collector assembly 18 is positioned to intercept the ion beam at a point subsequent to the separation of the beam. This collector assembly comprises a rectangularly-shaped box-like shield 44 having one end thereof secured to base member 11 in cantilever fashion, and having an aperture 45 formed in the free end thereof for accommodating ions having a desired mass-to-charge ratio. A collector electrode 46 is supported within shield 44 on an insulator 47 and is positioned so as to intercept the ion beam after passage through aperture 45, and positioned intermediate the aperture 45 and the collector electrode 46 is an additional electrode 48 to which a separate potential may be applied if desired. While the construction of the collector assembly 18 as shown in Figs. 1–4 is the preferred construction of the invention, it can be appreciated that the collector assembly may readily be modified to accommodate two separate ion beams having different mass-to-charge ratios, if desired, by a simple alteration of the collector assembly construction and providing two separate apertures in the free end of the box-like structure 44 to accommodate the desired ion beams. Also, if desired, an output amplifier such as that shown at 49 in Fig. 2 may be mounted within the box-like shield 44, and a suitable output connection 50 provided for deriving output electric signals from the collector electrode 46.

The entire structure comprised by base member 11, and the ion source 13, the analyzing magnets 16 and 17 and collector assembly 18 which are secured thereto, is adapted to be supported within vacuum tight housing 12 in the manner shown in Fig. 2 of the drawings. For this purpose, the base member 11 has a groove formed in one surface for accommodating an O-ring gasket that allows the base member to be supported on the housing 12 in vacuum tight relationship. The housing 12 may comprise a stainless steel pipe having a diameter in the neighborhood of 4½", and is connected through a check valve 51, manifold 52, and suitable piping to a rough-pump 53 for evacuating the entire housing structure to a high degree.

From a consideration of the foregoing description, it can be appreciated that all the essential components of a mass spectrometer type gas analyzer instrument are supported within one single housing thus simplifying greatly its construction and facilitating alignment of the various component parts thereof, as well as the maintenance of such alignments while the instrument is in operation. Hence, it can be appreciated that the invention provides a new and improved gas analyzing instrument simple in construction and relatively inexpensive to manufacture wherein the essential component parts are supported within a single housing member adapted to be evacuated. By constructing the instrument in this manner, the need for an elaborate vacuum system, the need for separate analyzer tube heretofore required in known instruments of this type, are done away with. Further, this type of construction facilitates initial alignment of all of the essential parts of the instrument as well as maintenance of the instrument while in operation. The above advantages are incorporated in the instrument without in any way sacrificing its sensitivity or speed of response when contrasted to the existing known instruments, and by properly proportioning certain parameters the instrument can be made more sensitive than existing designs.

Obviously, other modifications and variations of the instant invention are possible in the light of the above teachings. It is, therefore, to be understood that changes may be made herein which are within the full intended scope of the invention and as defined in the appended claims.

What I claim as new and desire to secure by Letters Patent of the United States is:

1. A mass analyzing instrument comprising a base member, an ion source supported on said base member, means for introducing a gas to be analyzed into said ion source, a pair of magnets supported on said base member and positioned on opposite sides of the ion beam produced by said ion source for causing the ions to be separated out into different ion beams having distinct mass-to-charge ratios, and a collector assembly secured to said base member and disposed in the ion beam path, said base member and the components mounted thereon being adapted for insertion in a single housing structure.

2. A mass analyzing instrument comprising a base member, an ion source supported on said base member having an electron filament assembly, means for introducing a gas to be analyzed into said ion source, a first pair of opposed magnets supported on said base member so as to be on opposite sides of said ion source and aligned with said electron filament assembly for collimating the beam of electrons produced by said filament assembly, a second pair of magnets supported on said base member and positioned on opposite sides of the ion beam produced by said ion source for causing the ions to be separated out into different ion beams having distinct mass-to-charge ratios, and a collector assembly secured to said base member and disposed in the ion beam path, said base member and the components mounted thereon being adapted for insertion in a single integral housing.

3. A mass analyzing instrument comprising a base member, an ion source supported on said base member having an electron filament assembly, means for introducing a gas to be analyzed into said ion source, a first pair of opposed magnets supported on said base member so as to be on opposite sides of said ion source and aligned with said electron filament assembly for collimating the beam of electrons produced by said filament assembly, a second pair of magnets supported on said base member and positioned on opposite sides of the ion beam produced by said ion source for causing the ions to be separated out into different ion beams having distinct mass-to-charge ratios, a box-like shield structure secured to said base member in cantilever fashion, and a collector electrode insulatingly supported on the free end of said shield structure and disposed in the ion beam path, the free end of said shield structure having an aperture therein for accommodating the ion beam and said base member with the elements mounted thereon being adapted for insertion in a single housing structure.

4. A mass analyzing instrument comprising a base member, an ion source supported on said base member and having an electron filament assembly secured to one side of said ion source, said ion source having an aperture therein for accommodating a beam of electrons produced by said filament assembly, a first set of magnets aligned with the electron filament assembly for collimating the electron beam, said first set of magnets being supported on the opposite ends of a yoke, a post having one end secured to said base member in cantilever fashion and having said yoke secured thereto intermediate the ends thereof, a second set of magnets secured to the free end of said post and positioned on opposite sides of the ion beam produced by said ion source, a box-like shield structure secured to said base member in cantilever fashion, and a collector electrode insulatingly supported within the free end of said shield structure and disposed in the ion beam path, the free end of said shield structure having an aperture therein for accommodating the ion beam.

References Cited in the file of this patent
UNITED STATES PATENTS

| | | |
|---|---|---|
| 2,341,551 | Hoover | Feb. 15, 1944 |
| 2,355,658 | Lawlor | Aug. 15, 1944 |
| 2,511,728 | Long | June 13, 1950 |
| 2,537,025 | Berry | Jan. 9, 1951 |
| 2,551,544 | Nier et al. | May 1, 1951 |
| 2,587,647 | Pallette | Mar. 4, 1952 |
| 2,624,845 | Thompson | Jan. 6, 1953 |